(12) United States Patent
Redi

(10) Patent No.: US 6,556,582 B1
(45) Date of Patent: Apr. 29, 2003

(54) SYSTEMS AND METHODS FOR COLLISION AVOIDANCE IN MOBILE MULTI-HOP PACKET RADIO NETWORKS

(75) Inventor: Jason Keith Redi, Somerville, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/570,873

(22) Filed: May 15, 2000

(51) Int. Cl.[7] ............................................. H04L 12/413
(52) U.S. Cl. ...................... 370/443; 370/447; 370/448
(58) Field of Search ................... 455/338, 337; 370/342, 331, 442, 443, 452, 95, 449, 461, 323, 346, 335, 348, 402, 447, 448, 455, 462

(56) References Cited

U.S. PATENT DOCUMENTS

| | | | | |
|---|---|---|---|---|
| 4,661,902 A | * | 4/1987 | Hochsprung et al. | 370/445 |
| 5,128,932 A | * | 7/1992 | Li | 370/236 |
| 5,231,634 A | * | 7/1993 | Giles et al. | 370/348 |
| 5,371,734 A | * | 12/1994 | Fischer | 370/311 |
| 5,502,724 A | * | 3/1996 | Chen et al. | 370/445 |
| 5,592,483 A | * | 1/1997 | Hieda et al. | 370/445 |
| 5,729,537 A | * | 3/1998 | Billstrom | 370/329 |
| 5,752,193 A | * | 5/1998 | Scholefield et al. | 370/329 |
| 5,844,900 A | * | 12/1998 | Hong et al. | 370/342 |
| 5,844,905 A | * | 12/1998 | McKay et al. | 370/443 |
| 6,097,703 A | * | 8/2000 | Larsen et al. | 370/254 |
| 6,192,053 B1 | * | 2/2001 | Angelico et al. | 370/448 |
| 6,226,279 B1 | * | 5/2001 | Hansson et al. | 370/329 |
| 6,236,662 B1 | * | 5/2001 | Reilly | 370/462 |
| 6,321,095 B1 | * | 11/2001 | Gavette | 455/410 |
| 6,331,973 B1 | * | 12/2001 | Young et al. | 370/337 |
| 6,363,062 B1 | * | 3/2002 | Aaronson et al. | 370/348 |
| 6,411,617 B1 | * | 6/2002 | Kilkki et al. | 370/353 |
| 6,466,608 B1 | * | 10/2002 | Hong et al. | 375/137 |

* cited by examiner

Primary Examiner—Thanh Cong Le
Assistant Examiner—Tan Trinh
(74) Attorney, Agent, or Firm—Leonard Charles Suchyta; James K. Weixel

(57) ABSTRACT

A first wireless node provides a method of avoiding multiple access collision in a wireless network. The system receives a request to send data from a second wireless node (405) and determines if the system is receiving data from a third node (410). The system transmits a non-authorization message if the system is receiving data from the third node (415). If, however, the system is not receiving data from the third node, the system transmits an authorization message to the first wireless node (420). The system receives data from the second node in response to the authorization message (425) and then transmits an acknowledgment message to the second node acknowledging receipt of the data (435).

47 Claims, 7 Drawing Sheets

SYSTEMS AND METHODS FOR COLLISION AVOIDANCE IN MOBILE MULTI-HOP PACKET RADIO NETWORKS

FIELD OF THE INVENTION

The present invention relates generally to packet radio networks and, more particularly, to improved techniques for multiple access collision avoidance (MACA) in mobile multi-hop packet radio networks.

BACKGROUND OF THE INVENTION

Wireless data communication is often required in an environment where communications infrastructure, such as base stations or a wired backbone network, does not exist or is uneconomical or impractical to use. For example, in military or emergency environments, adequate infrastructure often does not exist in necessary locations and constructing such an infrastructure would be either impractical or uneconomical for the short-term use that is often required. Mobile multi-hop wireless networks have, therefore, been developed to provide wireless data communications in such environments.

In a conventional mobile wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop wireless network to perform effectively, all nodes must, therefore, be prepared to route packets on behalf of other nodes.

One problem in the routing of packets between nodes in a conventional multi-hop wireless network is commonly called the "hidden terminal" problem. FIG. 1 is a diagram of routing that illustrates this problem in such a conventional multi-hop wireless network. The illustrative network includes three nodes 120, 125, and 130 that communicate with one another. As shown, each node (120, 125, and 130) has an effective radio range delineated by dotted lines 105, 110 and 115, respectively. Since the radio range of Node 120 (dotted line 105) encompasses Node 125, Node 120 is able to communicate with Node 125. Node 120, however, is not within radio range of Node 130 and, therefore, cannot directly communicate with Node 130. Likewise, Node 130 can communicate with Node 125, but cannot communicate with Node 120.

To communicate with Node 130, Node 120 routes its packets through Node 125 and vice versa. In this case, Node 125 relays the packets to nodes 120 and 130. If both Nodes 120 and 130 route packets through Node 125, however, packet "collisions" may occur at Node 125. Packet collisions are particularly likely when Nodes 120 and 130 attempt to send packets to Node 125 simultaneously. If a collision occurs, Node 125 refuses further packets from either Node 120 or Node 130. If this happens, both nodes 120 and 130 will keep attempting to re-transmit their packets to Node 125. This results in further collisions. In a multi-hop network that has many intervening hops between a sending node and a receiving node, packet collision can be a very significant problem that will cause a large loss in throughput.

Multiple access collision avoidance (MACA) is a common technique used to deal with the problem of packet collision. This technique uses a Request-to-Send/Clear-to-Send/data/Acknowledgment (RTS/CTS/data/ACK) messaging exchange to prevent packet collision. FIG. 2 is a diagram illustrating Conventional MACA. Using this technique, Node 120 first sends a Request-to-Send (RTS) packet [205] to Node 125 before transmitting any data packets. If the wireless channel is idle at Node 125, then Node 125 sends a Clear-to-Send (CTS) packet [210] to Node 120. In response to the CTS packet, Node 120 sends data packets [215] to Node 125. Since Node 130 is within the effective radio range of Node 125, Node 130 also receives the CTS packet designated for Node 120. Node 130, thus, knows that Node 125 is busy receiving a packet from Node 120 and, therefore, waits for a period of time to attempt to send a transmission. Node 125 marks the end of the MACA sequence by Acknowledging (ACK) [220] receipt of the packet from Node 120. Again, since Node 130 is within the radio range of Node 125, Node 130 also receives the ACK packet intended for Node 120. Node 130, therefore, recognizes that Node 120 has finished sending data and Node 130 sends its own RTS packet [225] to Node 125.

The conventional MACA technique shown in FIG. 2, however, has a number of fundamental problems. One problem is that the conventional RTS/CTS messaging scheme does not always prevent nodes from attempting to communicate with other nodes that are already busy. For example, a node may have moved into a transmission area after RTS/CTS packets were exchanged between two nodes. In another example, a node may have been busy performing another task when the RTS/CTS control packets were exchanged between two other nodes. In a further example, there may be collisions on a channel reserved for RTS/CTS control packets, such that a node did not "hear" the same control packets that a sender and receiver "heard."

When a node "misses" a RTS/CTS exchange between two other nodes, it may subsequently attempt to send a packet to one of the nodes by sending an RTS packet. If the destination node is already busy receiving a packet, the destination node ignores the RTS. Receiving no response to the RTS, the sending node typically waits a short time and then sends another RTS. Since the destination node may still be busy receiving a packet, the destination node fails to respond with a CTS. In a wireless multi-hop network, every node keeps track of its link state with every other neighboring node. Therefore, after repeated attempts to contact a destination, the sending node updates its link state information to indicate that a problem exists with its link to the particular destination node. The updated link state information thus gives the sending node an inaccurate account of the actual quality of the link state. This can cause rapid changes of link state called "link flapping" as the destination node alternates between "busy" and "non-busy." Missing the RTS/CTS exchange can, therefore, have a negative impact on link metric calculations, which can further affect the topology of the network and the quality of service used for packet transmission.

Another problem relating to the conventional MACA technique is its inability to provide quality of service and priority mechanisms (QoS/priority) that reserve channel or radio resources to ensure high quality data transfer or expedited packet routing. Quality of service and priority mechanisms are conventionally implemented in wireless multi-hop systems, but these mechanisms typically perform packet-type specific processing in the network layer that resides above the physical radio layer. These conventional QoS/priority mechanisms are disadvantageous in that, though they may place packets into appropriate low or high quality/priority queues at intermediate hops along the source-to-destination path, the packets still use radio resources (e.g., bandwidth, receiver power, etc.) regardless of the packets' quality of service or priority type. With non-priority or low quality of service type packets using some bandwidth, necessary bandwidth may not be available to ensure quick delivery of high priority type packets. Also, a given node within the source-to-destination path may not have sufficient power or processing resources to route packets other then high QoS/priority type packets.

Numerous time-based methods have been suggested for giving higher priority traffic quicker access to radio resources, such as, for example, short back-off timers. These time-based methods, however, still permit routing of packets to nodes when there is low-to-moderate contention on the wireless channel, regardless of the packets' Qos/priority service requirements.

As a result, a need exits for a multiple access collision avoidance mechanism that can accommodate situations in which a node fails to "hear" an RTS/CTS exchange between other nodes and which provides reservation of channel or radio resources based on quality of service or priority service requirements of a transmitted data packet.

SUMMARY OF THE INVENTION

Systems and methods consistent with the present invention address this need by providing mechanisms that improve conventional multiple access collision avoidance techniques. These mechanisms include a Not-Clear-to-Send (NCTS) control packet sent from an intended destination node to a sending node in response to a RTS packet. The NCTS packet permits other nodes to be aware that the data transceiver of the intended destination node is currently busy and unable to receive any more data packets. The mechanisms further include adding priority status and/or quality of service (QoS) data to RTS packets. The additional priority/QoS data in the RTS packet permits destination nodes to route data packets in accordance with the priority/QoS service requirements of sending nodes.

In accordance with the purpose of the invention as embodied and broadly described herein, a system prevents multiple access collisions in a wireless network. The system receives a request to send data from a second wireless node and determines if the system is receiving data from a third node. The system transmits a non-authorization message if the system is receiving data from the third node. If, however, the system is not receiving data from the third node, the system transmits an authorization message to the first wireless node. The system receives data from the second node in response to the authorization message and then transmits an acknowledgment message to the second node acknowledging receipt of the data.

In another implementation consistent with the present invention, a system transmits data from a first node in a wireless network connecting the first node to at least second and third nodes. The system sends a first request to send data to the second node. In response to the first request, the system receives a non-authorization message indicating that the second node is receiving data from a third node. The system then transmits a second request to send data to the second node. In response to the second request, the system receives an authorization message from the second node and transmits the data to the second node. The system receives an acknowledgement message acknowledging receipt of said data.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide low-overhead and low-complexity mechanisms that improve conventional multiple access collision avoidance techniques. These include a Not-Clear-to-Send (NCTS) control packet sent from an intended destination node to a sending node in response to a RTS packet. The NCTS packet permits other nodes to become aware that the data transceiver of the intended destination node is currently busy and unable to receive any more data packets. The mechanisms further include adding priority status and/or quality of service (QoS) data to RTS packets. The additional priority/QoS data in the RTS packet permits destination nodes to route data packets in accordance with the priority/QoS service requirements of sending nodes.

EXEMPLARY SYSTEM

Figure 3:
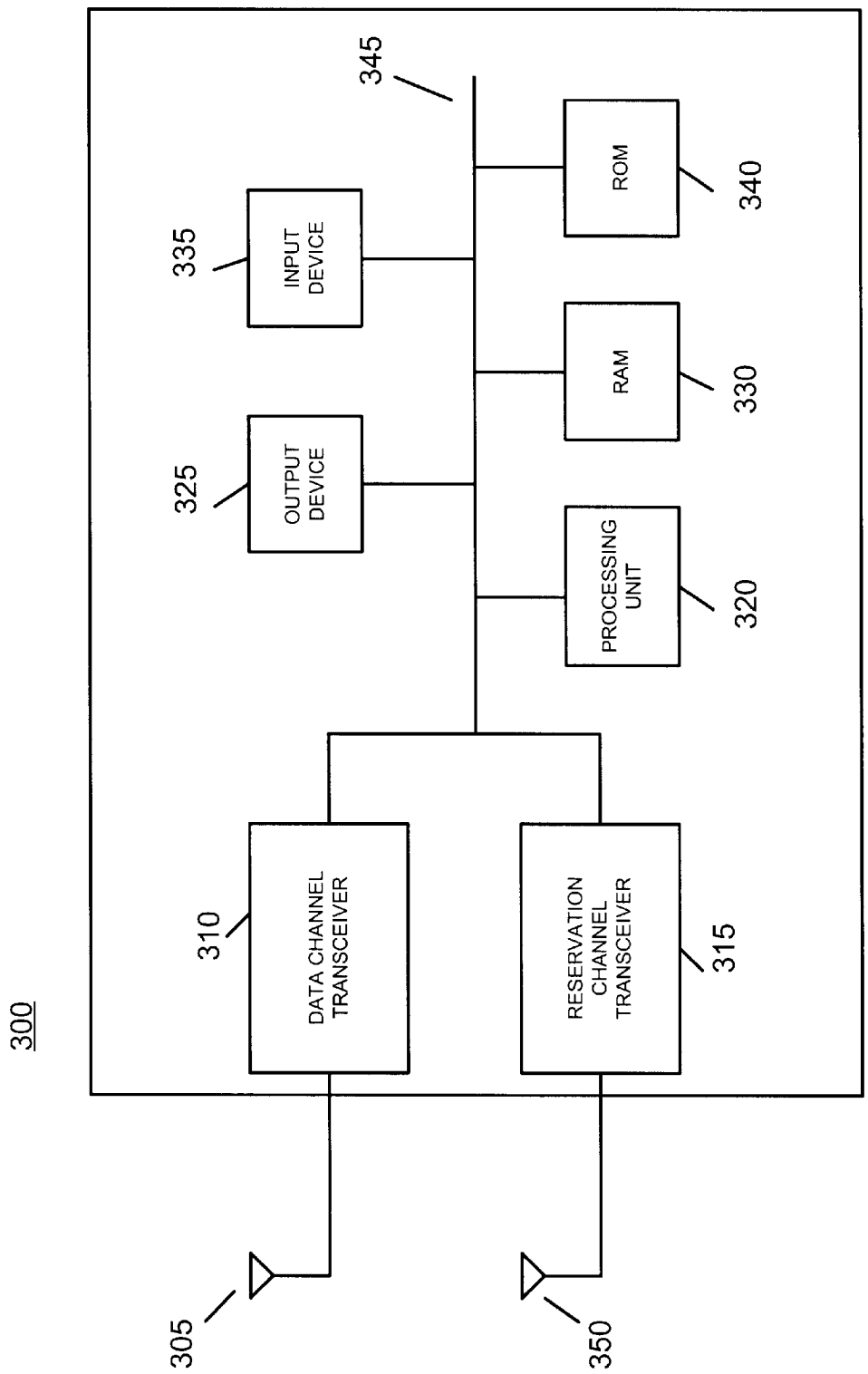
FIG. 3 illustrates a dual transceiver wireless node consistent with the present invention.

FIG. 3 illustrates an exemplary wireless node 300 in which a method, consistent with the present invention, may be implemented to improve conventional multiple access collision avoidance mechanisms. Exemplary wireless node 300 includes antennas 305 and 350, a data channel transceiver 310, a reservation channel transceiver 315, an output device 325, an input device 335, a processing unit 320, a Random Access Memory (RAM) 330, a Read Only Memory (ROM) 340, and a bus 345. Antennas 305 and 350 facilitate reception and transmission of data and control packets by data channel transceiver 310 and reservation channel transceiver 315, respectively.

Data channel transceiver 310 may include transceiver circuitry well known to one skilled in the art, and can be tuned to multiple channels reserved for transmitting data in a multi-hop wireless network (i.e., a channel can be a frequency, code, or time division of a physical radio frequency). Reservation channel transceiver 315 can further consist of transceiver circuitry well known to one skilled in the art, and can be tuned to a channel reserved for sending and receiving control packets in the wireless multi-hop network. Reservation channel transceiver 315, for example, can be tuned to a channel reserved for sending and receiving control packets such as RTS, CTS, or ACK control packets. Using this dual transceiver configuration, any two wireless nodes in a multi-hop wireless network will have a common reservation channel for sending control packets and one or more data channels for sending data packets. The common reservation channel will enable any node in the network to keep track, via control packets, of which data channels are currently being used by other nodes, while, at the same time, the node is also transmitting or receiving data packets to or from other nodes.

Input device 335 permits entry of data into wireless node 300 and output device 325 permits the output of wireless node data in video, audio, or hard copy format. Processing unit 320 performs all data processing functions for inputting, outputting, and processing of wireless node data. RAM 330 provides temporary working storage of node data and instructions for use by processing unit 320. ROM 340 provides permanent or semi-permanent storage of data and instructions for use by processing unit 320. RAM 330 and ROM 340 may include large-capacity storage devices, such as a magnetic and/or optical recording medium and its corresponding drive. Bus 345 interconnects the various components of node and allows the components to communicate with one another.

EXEMPLARY PROCESSING OF NCTS

Figure 4:
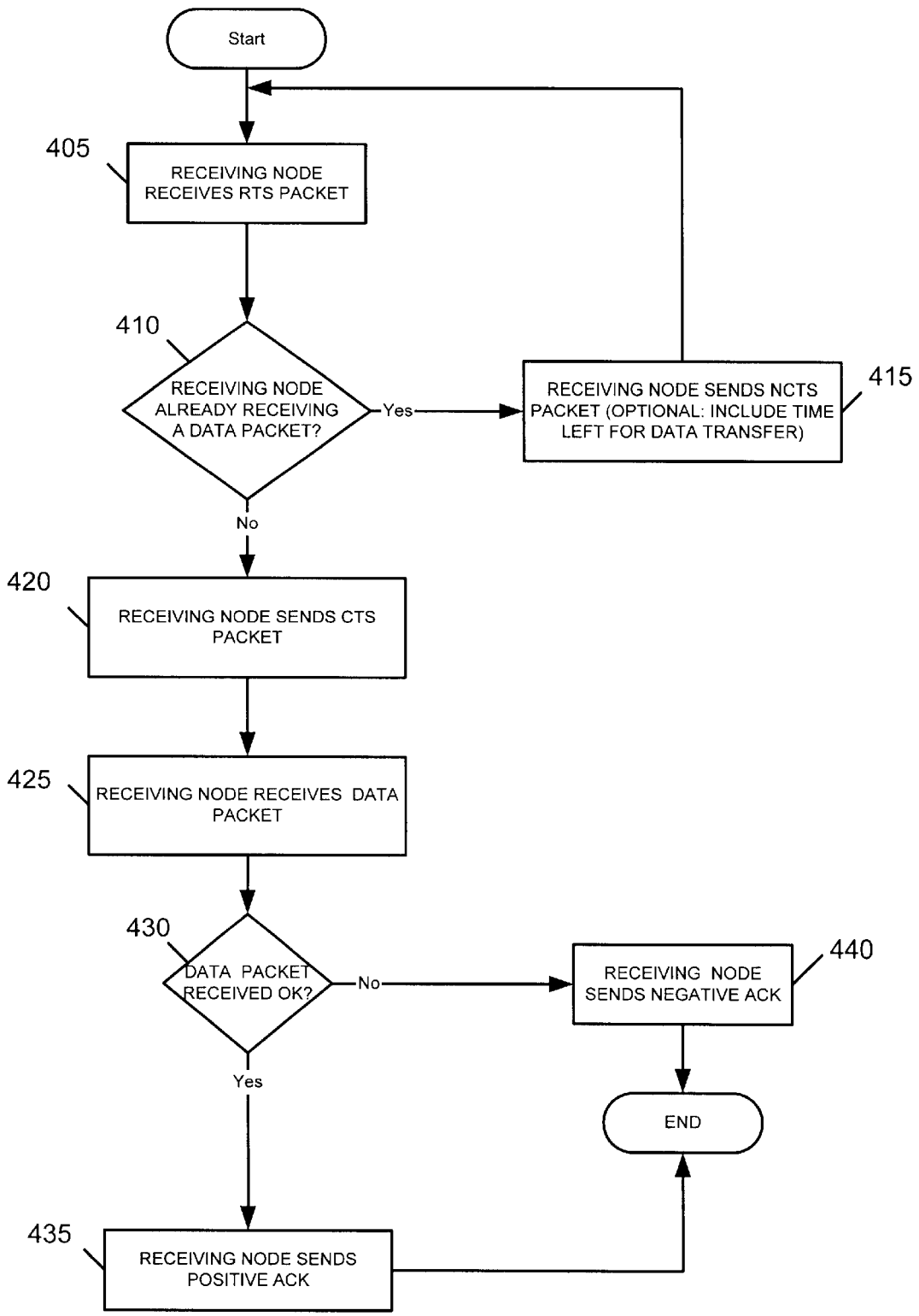
FIG. 4 illustrates a flow diagram of a multiple access collision avoidance scheme consistent with one exemplary embodiment of the present invention.

FIG. 4 is a flowchart of a first exemplary method, consistent with the invention, for implementing a Not-Clear-to-Send (NCTS) packet in a Multiple Access collision avoidance scheme. As one skilled in the art will appreciate, the method exemplified by FIG. 4 can be implemented as a sequence of instructions and stored in ROM 340 of wireless node 300 for execution by processing unit 320. A NCTS packet indicates that an intended destination node is receiving data packets from another node and, therefore, currently cannot receive data packets from a sending node. A NCTS packet may be approximately the same length as a conventional RTS or CTS packet (e.g., typically 100 bits) and may also include an optional time value that indicates the time left for the intended destination node to finish receiving a current data transfer.

Processing begins with a receiving wireless node receiving a RTS packet from a sending node that requests data communication with the receiving node [step 405]. The receiving node determines whether it is already receiving one or more data packets from another node [step 410]. If the receiving node determines that it is already receiving one or more data packets, then the receiving node sends an NCTS packet [step 415]. The NCTS may optionally include bits indicating the time left for the receiving node to finish its current data transfer with the other node. After receipt of the NCTS packet, the sending node may wait until the receiving node sends an ACK message to the other node indicating the end of the data transfer before attempting to send another RTS packet. Alternatively, after receipt of the NCTS packet, the sending node may wait a period of time at least equal to the optional time value that may have been received in the NCTS packet before attempting to send another RTS packet.

If the receiving node determines that it is not receiving data packets from another node [step 410], then the receiving node sends a CTS packet back to the sending node [step 420]. After receipt of the CTS packet, the sending node sends a data packet to the receiving node [step 425]. In accordance with conventional error detection techniques, the receiving node may determine whether the data packet has been properly received [step 430]. If the data packet was properly received, then the receiving node sends a positive ACK packet back to the sending node indicating the end of the data transfer [step 435]. If, however, the receiving node did not properly receive the data packet, the receiving node sends a negative ACK back to the sending node [step 440]. In response to the negative ACK, the sending node may re-transmit the data packet to the receiving node.

Figure 1:
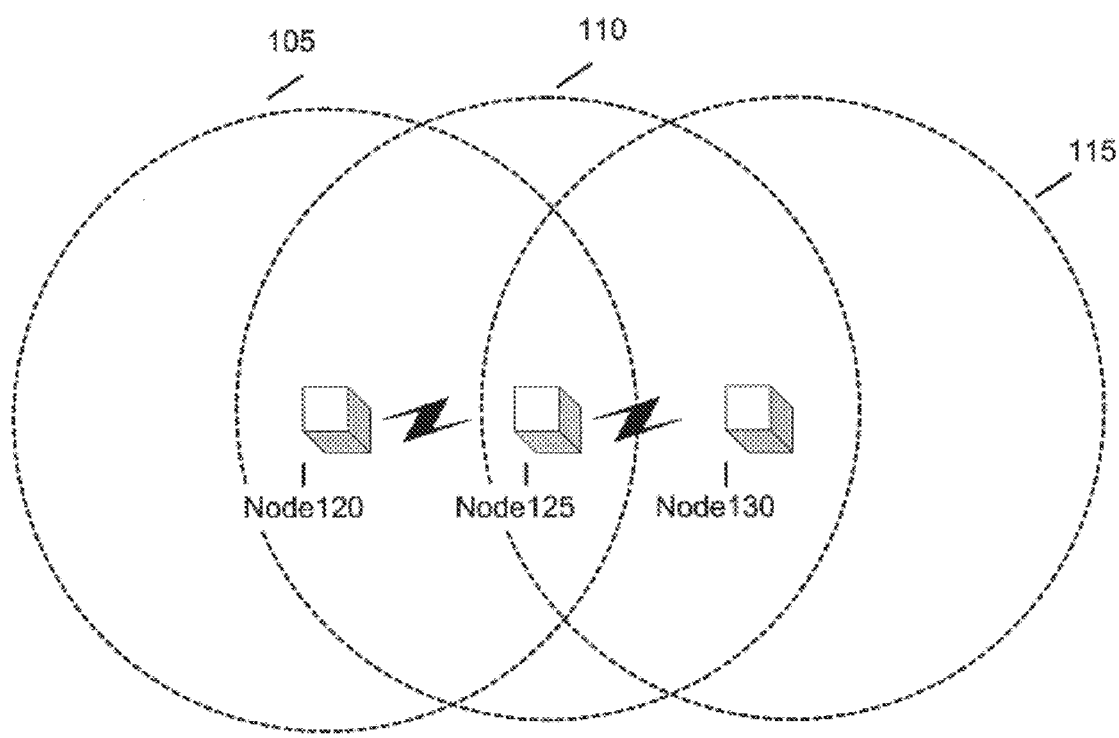
FIG. 1 illustrates three nodes in a conventional wireless multi-hop network.
Figure 2:
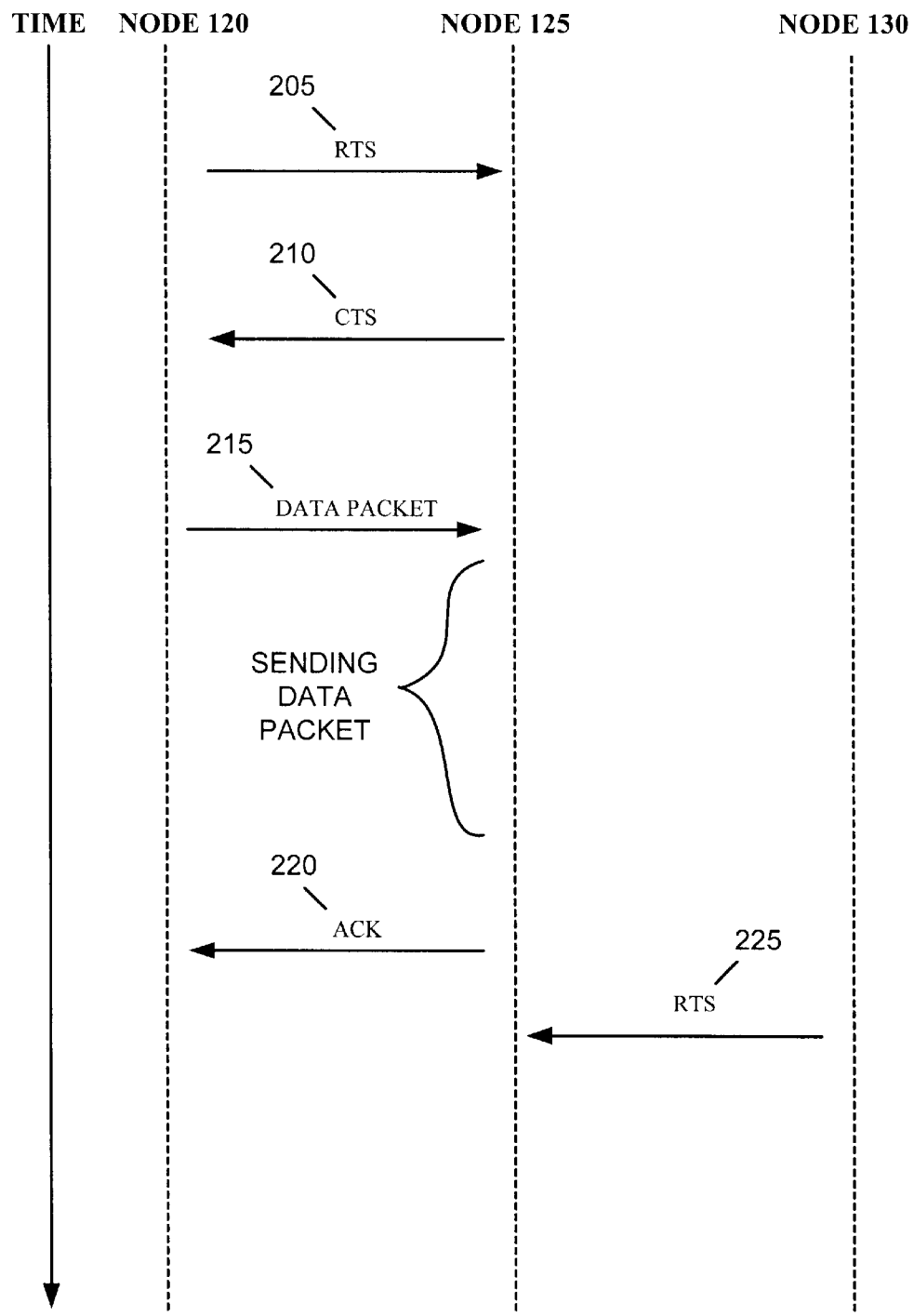
FIG. 2 illustrates conventional multiple access collision avoidance messaging.
Figure 5:
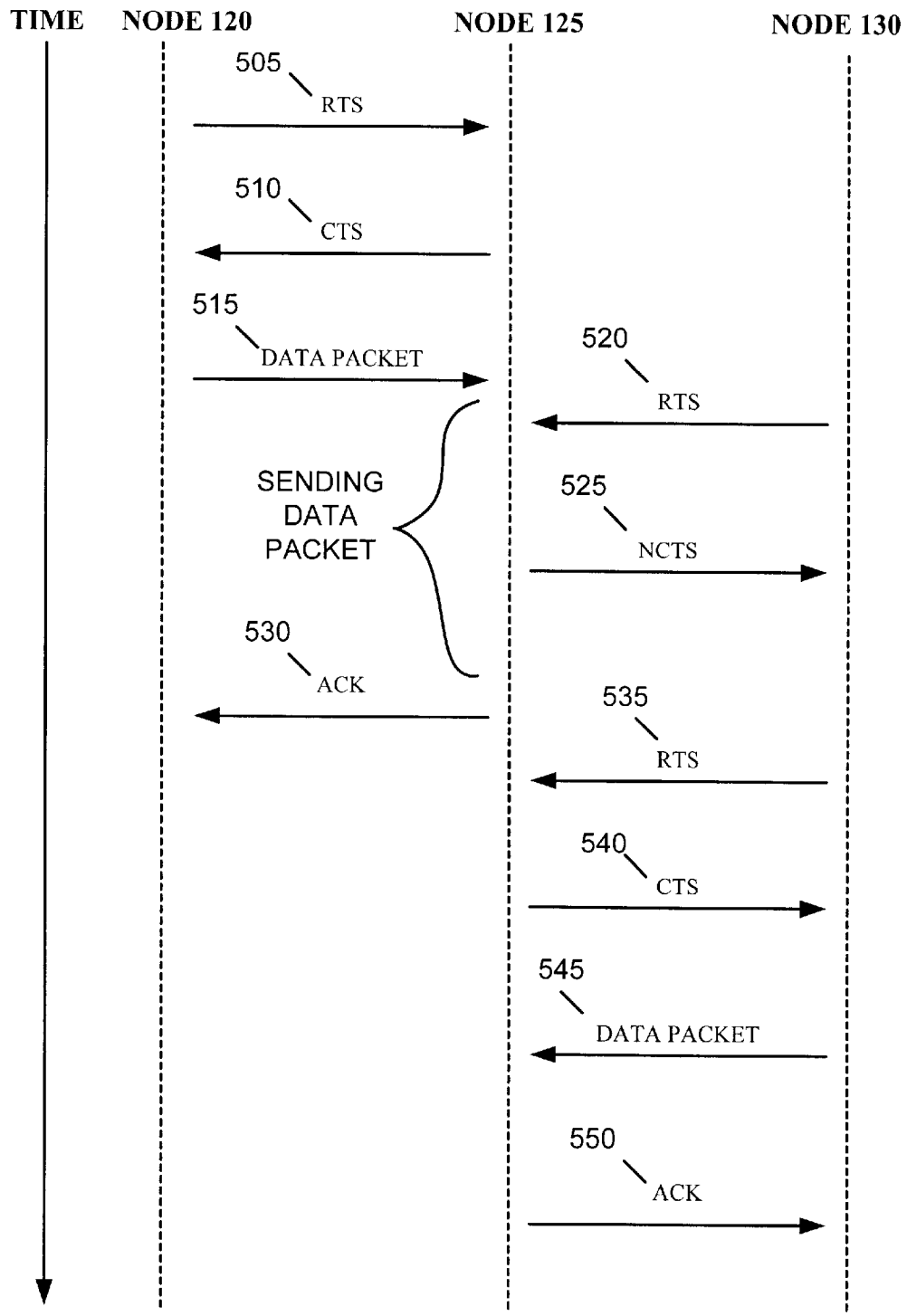
FIG. 5 illustrates multiple access collision avoidance messaging consistent with the exemplary embodiment of FIG. 4.

FIG. 5 illustrates an exemplary messaging diagram, consistent with the flow diagram of FIG. 4, that details RTS/CTS-NCTS/data/ACK packet exchange between Nodes 120, 125, and 130 (FIG. 1). Assume that Node 120 first moves within Node 125's radio range and sends a RTS packet [505] to Node 125. In this example, Node 125 determines that it is not currently receiving data packets from another node and, therefore, sends a Clear-to-Send (CTS) packet [510] back to Node 120. In response to the CTS packet, Node 120 sends a data packet [515] to Node 125. Assume that Node 130 moves into Node 125's radio range during data packet transfer from Node 120 to Node 125, but after transmission of the CTS packet. Node 130 sends a RTS [520] packet to Node 125. Since Node 125 is in the process of receiving a data packet from Node 120, Node 125 sends a Not-Clear-to-Send (NCTS) [525] packet back to Node 130 and completes communication with Node 120 by sending an ACK [530].

After receipt of the NCTS packet, Node 130 waits a period of time before sending another RTS packet [535]. Because Node 125 has finished receiving the data packet from Node 120, it sends a CTS packet [540] to Node 130 in response to the RTS packet. Node 130 then responds by sending the data packet [545] to Node 125. After receipt of the data packet, Node 125 sends an ACK packet [550] back to Node 130, completing the data transfer.

EXEMPLARY PROCESSING OF PRIORITY/QOS

Figure 6:
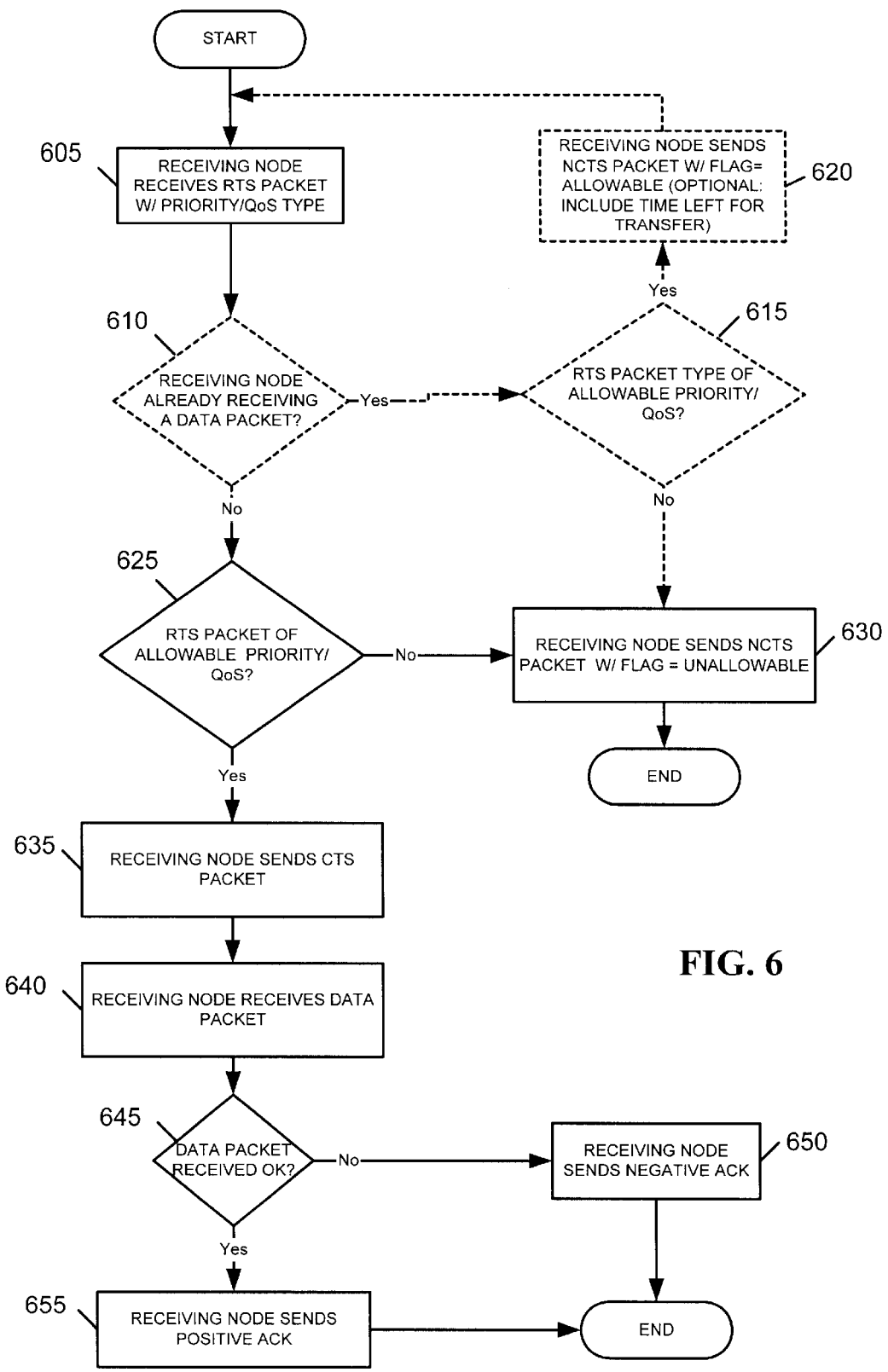
FIG. 6 illustrates a flow diagram of a multiple access collision avoidance scheme consistent with a second exemplary embodiment of the invention.

FIG. 6 is a flowchart of a second exemplary method, consistent with the invention, in which a RTS packet additionally includes an indication of a priority status/quality of service (priority/QoS) type of a sending node's data packet. As one skilled in the art will appreciate, the method exemplified by FIG. 6 can be implemented as a sequence of instructions stored in ROM 340 of wireless node 300 for execution by processing unit 320. The dotted lines in FIG. 6 indicate step(s) that occur in some implementations consistent with the present invention buy may not occur in others. In this exemplary method, one or more bits may be added to the conventional RTS packet to specify the priority status or quality of service type of a packet. A flag can additionally be included in the NCTS packet to provide an indication to the sending node that the receiving node is denying/allowing transfer to the requesting node based on the priority/QoS type bits contained in the RTS packet. The flag can optionally be replaced with multiple bits to permit the identification of the allowable types of data packets.

Processing begins with a receiving node receiving a RTS packet from a sending node requesting data communication with the receiving node [step 605]. The RTS packet contains priority/QoS bits indicating the priority status type or quality of service type of the data packet that is to be transmitted. The receiving node then may optionally determine if it is already receiving a data packet from another node [step 610]. If so, the receiving node further may determine if the packet that is to be sent is an allowable priority status or quality of service type [step 615]. If the priority/QoS bits sent in the RTS packet indicate that the packet is not of an allowable type, then the receiving node sends a NCTS packet with a flag set to indicate that the packet is unallowable [step 630]. This provides an indication to the sending node that the receiving node cannot meet the quality of service requirements of the packet the sending node is attempting to send, or that the packet is not of a priority status type that the receiving node is permitted to route. The sending node should, therefore, find an alternate route for this packet.

If the priority/QoS bits sent in the RTS packet indicate that the packet is an allowable priority/QoS type, then the receiving node may optionally send a NCTS packet with a flag set to indicate that the packet is allowable [step 620]. This provides an indication to the sending node that the receiving node can meet the quality of service requirements of the packet the sending node is attempting to send, or that the packet is of a priority status type that the receiving node is permitted to route. The NCTS packet may optionally include bits indicating a time period left for the receiving node to finish transferring a packet from another node.

After receipt of the NCTS packet, the sending node may wait until the receiving node sends an ACK message to the other node indicating an end of the data transfer before attempting to send another RTS packet. Alternatively, the sending node may wait a period of time at least equal to the optional time period bits that may have been received in the NCTS packet before attempting to send another RTS packet.

If it is determined that the receiving node is not currently receiving a data packet from another node [step 610], the receiving node further determines if the packet that is to be sent is an allowable priority status type or quality of service type [step 625]. If the priority/QoS bits sent in the RTS packet indicate that the packet is not of an allowable type, then the receiving node sends a NCTS packet with a flag set to indicate that the packet is unallowable [step 630]. In this case, the sending node should find an alternate route for this packet. If the priority/QoS type bits sent in the RTS packet indicate that the packet is of an allowable priority/QoS type, however, then the receiving node sends a CTS packet to the sending node [step 635]. In response to the CTS packet, the sending node sends a data packet to the receiving node [step 640].

In accordance with conventional error detection techniques, the receiving node may determine if the data packet has been properly received [step 645]. If so, then the receiving node sends a positive ACK packet back to the sending node indicating the end of the data transfer [step 655]. If, however, the receiving node did not properly receive the data packet, the receiving node sends a negative ACK back to the sending node [step 650]. In response to the negative ACK, the sending node may re-transmit the data packet to the receiving node.

Figure 7:
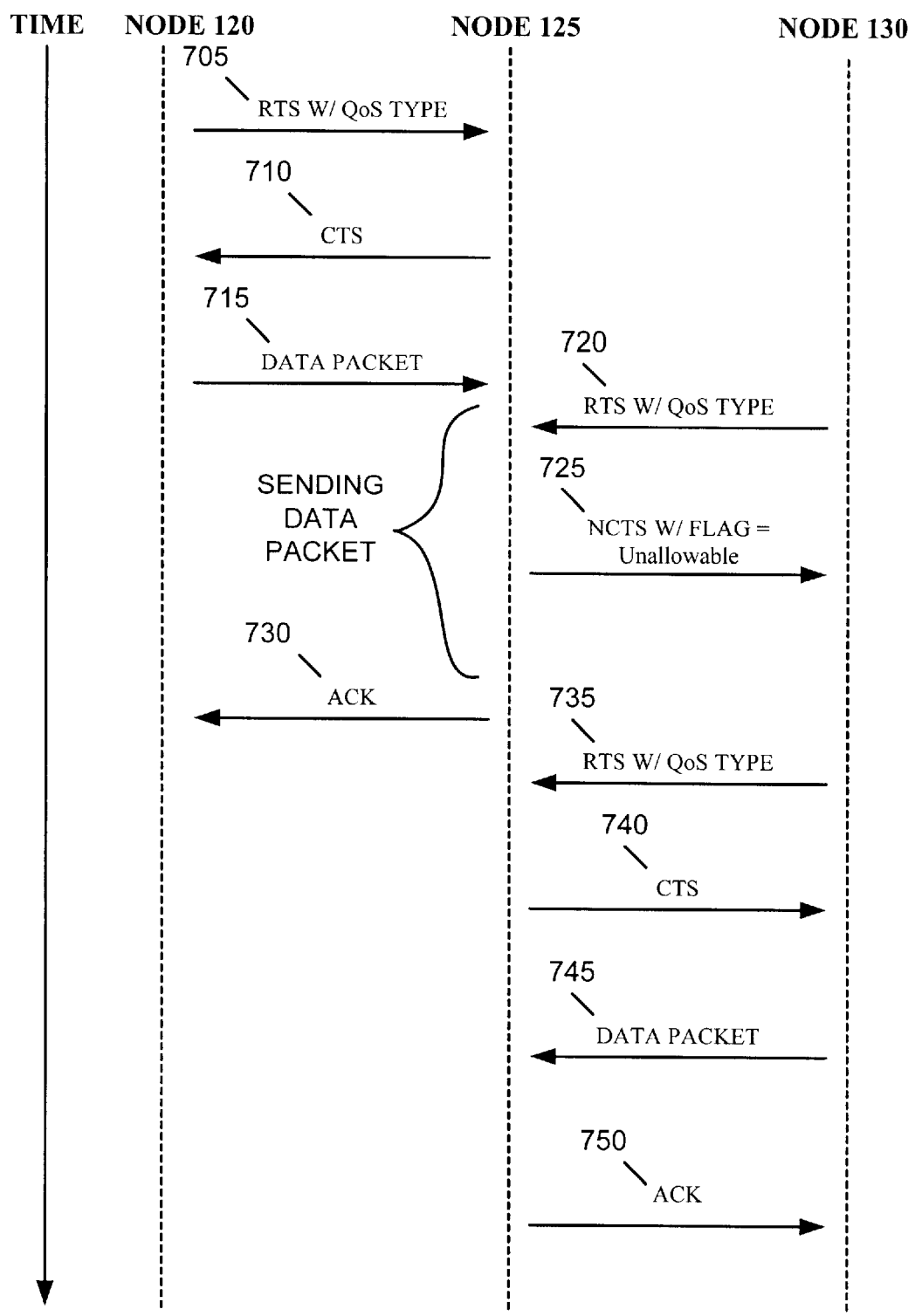
FIG. 7 illustrates multiple access collision avoidance messaging consistent with the exemplary embodiment of FIG. 6.

FIG. 7 illustrates an exemplary messaging diagram that details a RTS/CTS-NCTS/data/ACK packet exchange between Nodes 120, 125, and 130 (FIG. 1) in accordance with the exemplary method shown in FIG. 6. Assume that Node 120 first moves within Node 125's radio range and sends a RTS packet to Node 125 containing a priority/QoS type [705]. Node 125 determines that it is not currently receiving data packets from another node and sends a Clear-to-Send packet [710] back to Node 120. In response to the CTS packet, Node 120 begins sending a data packet [715] to Node 125.

Assume that during transfer of the data packet from Node 120 to Node 125, Node 130 moves into Node 125's radio range and attempts to send a RTS packet [720] containing a priority/QoS type to Node 125. Since Node 125 is receiving a data packet from Node 120, assume that Node 125 determines that the priority/QoS type contained in the RTS packet is allowable and then sends a Not-Clear-to-Send packet [725] back to Node 130 with the flag indicating the packet is allowable. The NCTS packet may optionally include bits indicating the remaining time required to finish transferring the data from Node 120.

After receipt of the NCTS packet, Node 130 may wait until Node 125 sends an ACK message [730] to Node 120 indicating the end of data transfer before sending another RTS packet [735]. Alternatively, after receipt of the NCTS packet, Node 130 may wait a period of time at least equal to the optional time value that may have been received in the NCTS packet before sending another RTS packet [735]. In response to receiving the RTS packet from Node 130, Node 125 sends a CTS packet [740] to Node 130. Node 130 then sends a data packet [745] to Node 125. After receipt of the data packet, Node 125 sends an ACK packet [750] back to Node 130, completing the data transfer.

CONCLUSION

Systems and methods consistent with the present invention provide mechanisms that improve conventional multiple access collision avoidance techniques. These mechanisms accommodate situations where a wireless node in a multi-hop network fails to "hear" an RTS/CTS exchange between other nodes. The mechanisms further provide reservation of channel or radio resources at hops throughout the wireless network based on quality of service or priority service requirements of a transmitted data packet.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the following claims and their equivalents.

What is claimed is:

1. A method of avoiding multiple access collisions at a first node in a network connecting the first node to at least second and third nodes, comprising:

receiving a request to send data from the second node;

determining if the first node is receiving data from the third node;

transmitting a non-authorization message if the first node is receiving data from the third node;

transmitting an authorization message if the first node is not receiving data from the third node;

receiving data from the second node in response to the authorization message; and transmitting an acknowledgement message to the second node acknowledging receipt of said data, wherein the non-authorization message further contains data indicating a time period that the second node should wait before transmitting another request to send data.

2. The method of claim 1, wherein the receiving a request includes:
   receiving an indication of a type of the data that is to be sent from said second node.

3. The method of claim 2, wherein the transmitting of an authorization or a non-authorization message is further based on the indicated type of the data.

4. The method of claim 2, wherein said type of data indicates a priority status type.

5. The method of claim 2, wherein said type of data indicates a quality of service type.

6. The method of claim 1, wherein the non-authorization message further contains data indicating that the second node should transmit the data to a different node.

7. A network, comprising:
   a first wireless node;
   a second wireless node configured to receive one or more data packets from the first wireless node; and
   a third wireless node configured to send a request to send one or more packets to said second wireless node, and receive a message from the second wireless node denying said request based on the second wireless node being busy receiving the one or more packets from the first wireless node,
   wherein the message further contains data indicating a time period that the third node should wait before transmitting another request to send packets to said second node.

8. The network of claim 7, wherein said request further comprises an indication of a type of said one or more packets.

9. The network of claim 8, wherein said type of said one or more packets is a priority status type.

10. The network of claim 8, wherein said type of said one or more packets is a quality of service type.

11. The network of claim 7, wherein the message comprises an indication that the third node should transmit the data to a different node.

12. A wireless device comprising:
   at least one transceiver; and
   a processor configured to:
      receive a request to send data from a first node,
      determine if the first node is receiving data from a second node,
      instruct the at least one transceiver to transmit a non-authorization message if the wireless device is receiving data from the second node,
      instruct the at least one transceiver to transmit an authorization message if the wireless device is not receiving data from the second node,
      receive data from the first node in response to the authorization message, and
      instruct the at least one transceiver to transmit an acknowledgement message to the first node acknowledging receipt of said data,
      wherein the non-authorization message further contains data indicating a time period that the first node should wait before transmitting another request to send data.

13. The wireless device of claim 12, the processor further configured to:
   receive an indication of a type of the data that is to be sent from said second node.

14. The wireless device of claim 13, wherein the instructions to the at least one transceiver to transmit an authorization or a non-authorization message are further based on the indicated type of the data.

15. The wireless device of claim 13, wherein said type of data indicates a priority status type.

16. The wireless device of claim 13, wherein said type of data indicates a quality of service type.

17. The wireless device of claim 12, wherein the non-authorization message further contains data indicating that the first node should transmit the data to a different node.

18. A computer-readable medium containing instructions for controlling at least one processor to perform a method that prevents multiple access collisions at a first node, the method comprising:
   receiving a request to send data from a second node;
   determining if the first node is receiving data from a third node;
   transmitting a non-authorization message if the first wireless node is receiving data from a third node;
   transmitting an authorization message if the first node is not receiving data from a third node;
   receiving data from the second node in response to the authorization message; and
   transmitting an acknowledgement message to the second node acknowledging receipt of said data,
   wherein the non-authorization message further contains data indicating a time period that the second node should wait before transmitting another request to send data.

19. The computer-readable medium of claim 18, the method further comprising:
   receiving an indication of a type of the data that is to be sent from said second node.

20. The computer-readable medium of claim 19, wherein said transmitting of an authorization or a non-authorization message is further based on the indicated type of the data.

21. The computer-readable medium of claim 19, wherein said type of data indicates a priority status type.

22. The computer-readable medium of claim 19, wherein said type of data indicates a quality of service type.

23. The computer-readable medium of claim 18, wherein the non-authorization message further contains data indicating that the second node should transmit the data to a different node.

24. A method of transmitting data from a first node in a network connecting the first node to at least second and third nodes, comprising:
   sending a first request to send data to the second node;
   receiving a non-authorization message indicating that the second node is receiving data from a third node;
   transmitting a second request to send data to the second node;
   receiving an authorization message from the second node in response to the second request;
   transmitting the data to the second node;
   receiving an acknowledgement message acknowledging receipt of said data; and
   receiving time data in said non-authorization message indicating a period of time to wait before transmitting said second request.

25. The method of claim 24, further comprising:
   receiving a message indicating that the second node is finished receiving data from the third node.

26. The method of claim 25, wherein transmission of the second request is based on receipt of the message indicating that the second node is finished receiving data from the third node.

27. A computer-readable medium containing instructions for controlling at least one processor to perform a method that transmits data from a first node, the method comprising:
sending a first request to send data to a second node;
receiving a non-authorization message indicating that the second node is receiving data from a third node;
transmitting a second request to send data to the second node;
receiving an authorization message from the second node in response to the second request;
transmitting the data to the second node;
receiving an acknowledgement message acknowledging receipt of said data; and
receiving time data in said non-authorization message indicating a period of time to wait before transmitting said second request.

28. The computer-readable medium of claim 27, the method further comprising:
receiving a message indicating that the second node is finished receiving data from the third node.

29. The computer-readable medium of claim 28, wherein transmission of the second request is based on receipt of the message indicating that the second node is finished receiving data from the third node.

30. A wireless device comprising:
at least one transceiver; and
a processor configured to:
send a first request to send data to a first node;
receive a non-authorization message indicating that the first node is receiving data from a second node,
instruct the at least one transceiver to transmit a second request to send data to the first node,
receive an authorization message from the first node in response to the second request,
instruct the at least one transceiver to transmit the data to the first node,
receive an acknowledgement message acknowledging receipt of said data, and
receive time data in said non-authorization message indicating a period of time to wait before transmitting said second request.

31. The wireless device of claim 30, the processor further configured to:
receive a message indicating that the second node is finished receiving data from the third node.

32. The wireless device of claim 31, wherein the instructions to transmit the second request is based on the receipt of the message indicating that the second node is finished receiving data from the third node.

33. A method of avoiding multiple access collision at a first node in a network coupling the first node to at least second and third nodes, comprising:
sending a first request to send first data to a second node;
receiving a non-authorization message from the second node indicating that the second node is receiving second data from a third node; and
sending a second request to send the first data responsive to sensing an acknowledgement message, sent from the second node to the third node, that indicates an end of transfer of the second data between the third node and the second node.

34. The method of claim 33, wherein the first request to send the first data comprises an indication of a priority status associated with the first data.

35. The method of claim 33, wherein the first request to send the first data comprises an indication of a quality of service requirement associated with the first data.

36. The method of claim 33, further comprising:
receiving an authorization message from the second node subsequent to sending the second request to send data; and
sending the first data to the second node responsive to receipt of the authorization message.

37. The method of claim 33, wherein the non-authorization message contains data indicating a time period the first node should wait before transmitting the second request to send the first data.

38. A first wireless node in a multi-hop packet radio network, comprising:
at least one transceiver; and
a processor configured to:
send, via the at least one transceiver, a first request to send first data to a second wireless node,
receive, via the at least one transceiver, a non-authorization message from the second wireless node indicating that the second wireless node is receiving second data from a third wireless node, and
send, via the at least one transceiver, a second request to send the first data responsive to sensing an acknowledgement message, sent from the second wireless node to the third wireless node, that indicates an end of transfer of the second data between the third wireless node and the second wireless node.

39. A computer-readable medium containing instructions for controlling at least one processor to perform a method of avoiding multiple access collision at a first wireless node in a multi-hop packet radio network coupling the first wireless node to at least second and third wireless nodes, the method comprising:
sending a first request to send first data to a second wireless node;
receiving a non-authorization message from the second wireless node indicating that the second wireless node is receiving second data from a third wireless node; and
sending a second request to send the first data responsive to sensing an acknowledgement message, sent from the second wireless node to the third wireless node, that indicates an end of transfer of the second data between the third wireless node and the second wireless node.

40. A method of transmitting data in a wireless packet-switched multi-hop network, comprising:
sending a first message requesting to send first data from a first node to a second node, wherein the first message indicates a priority status associated with the first data;
receiving a non-authorization message from the second node indicating that the second node is receiving second data from a third node, wherein the non-authorization message further comprises at least one of first and second indicators, the first indicator indicating that the second node is permitted to route the priority status associated with the first data, the second indicator indicating that the second node is not permitted to route the priority status associated with the first data;
determining whether to send a second message requesting to send the first data, based on the at least one of the first and second indicators, and responsive to sensing an acknowledgement message, sent from the second node to the third node, that indicates an end of transfer of the second data between the third node and the second node; and
sending the second message from the first node to the second node based on the determination.

41. The method of claim 40, further comprising:

receiving an authorization message from the second node indicating that the second node is no longer receiving second data from the third node; and sending the first data from the first node to the second node based on receipt of the authorization message.

42. The method of claim 40, wherein the first message indicates quality of service requirements associated with the first data.

43. The method of claim 42, wherein the non-authorization message further comprises at least one of third and fourth indicators, the third indicator indicating that the second node can meet the quality of service requirements associated with the first data, the fourth indicator indicating that the second node cannot meet the quality of service requirements associated with the first data.

44. The method of claim 43, wherein determining whether to send a second request to send the first data is further based on the at least one of the third and fourth indicators.

45. A first wireless node, comprising:

at least one wireless transceiver; and a processor configured to:
send a first message, via the at least one wireless transceiver, requesting to send first data from the first wireless node to a second wireless node, wherein the first message indicates a priority status associated with the first data, receive a non-authorization message, via the at least one wireless transceiver, from the second wireless node indicating that the second wireless node is receiving second data from a third wireless node, wherein the non-authorization message further comprises at least one of first and second indicators, the first indicator indicating that the second wireless node is permitted to route the priority status associated with the first data, the second indicator indicating that the second node is not permitted to route the priority status associated with the first data, determine whether to send a second request to send the first data, based on the at least one of the first and second indicators, responsive to sensing an acknowledgement message, sent from the second wireless node to the third wireless node, that indicates an end of transfer of the second data between the third wireless node and the second wireless node, and transmit the first data, via the at least one wireless transceiver, from the first wireless node to the second wireless node based on the determination.

46. A computer-readable medium containing instructions for controlling at least one processor to perform a method of transmitting data in a wireless packet-switched multi-hop network, the method comprising:

sending a first message requesting to send first data from a first node to a second node, indicates quality of service requirements associated with the first data;

receiving a non-authorization message from the second node indicating that the second node is receiving second data from a third node, wherein the non-authorization message further comprises at least one of first and second indicators, the first indicator indicating that the second node can meet the quality of service requirements associated with the first data, the second indicator indicating that the second node cannot meet the quality of service requirements associated with the first data;

determining whether to send a second request to send the first data based on the at least one of the first and second indicators, and responsive to sensing an acknowledgement message, sent from the second node to the third node, that indicates the end of transfer of the second data between the third node and the second node; and transmitting the first data from the first node to the second node based on the determination.

47. A system for avoiding multiple access collision at a first node in a network connecting the first node to at least second and third nodes, comprising:

means for sending a first request to send first data to a second node;

means for receiving a non-authorization message from the second node indicating that the second node is receiving second data from a third node; and means for sending a second request to send the first data responsive to sensing an acknowledgement message, sent from the second node to the third node, that indicates an end of transfer of the second data between the third node and the second node.

* * * * *